UNITED STATES PATENT OFFICE.

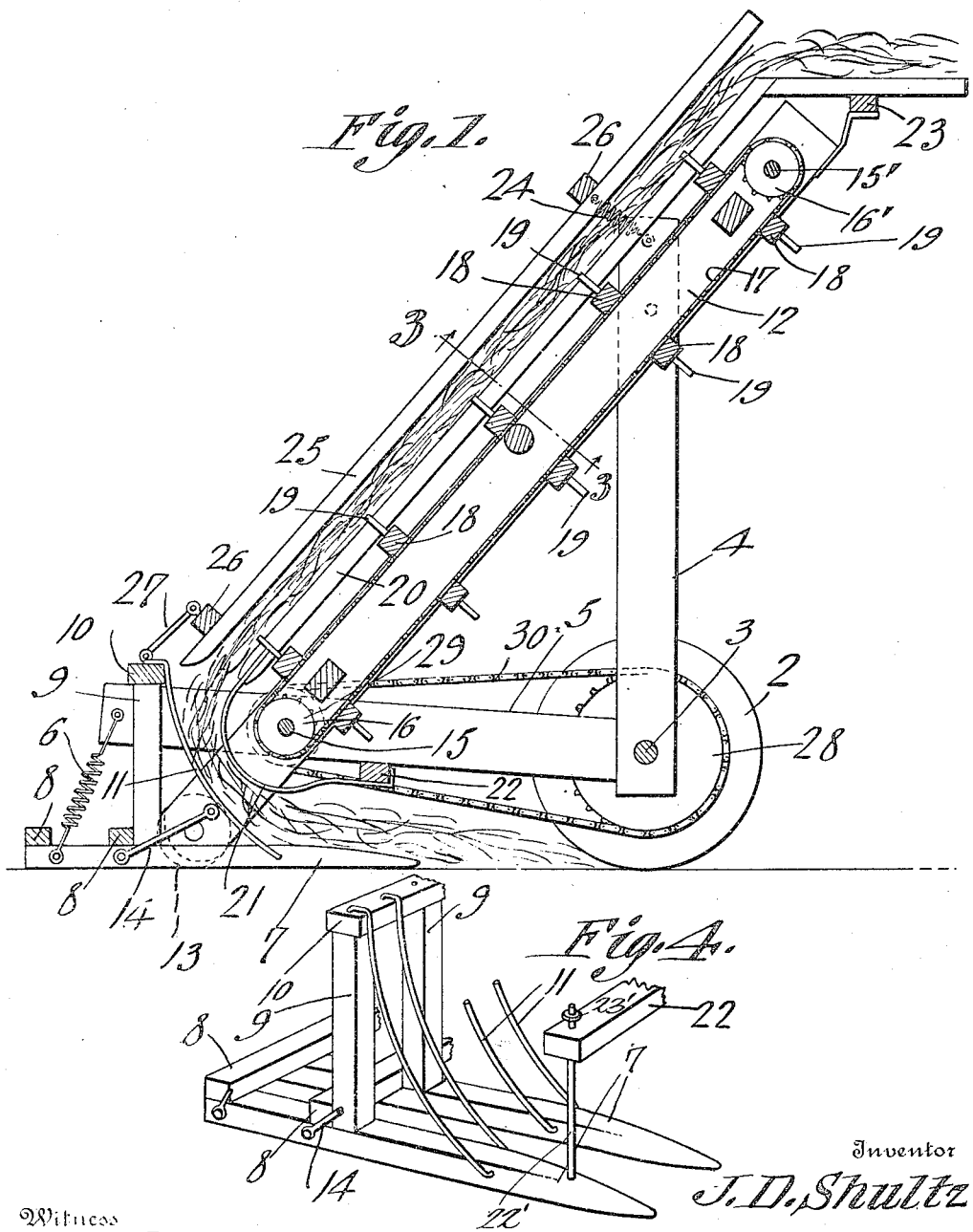

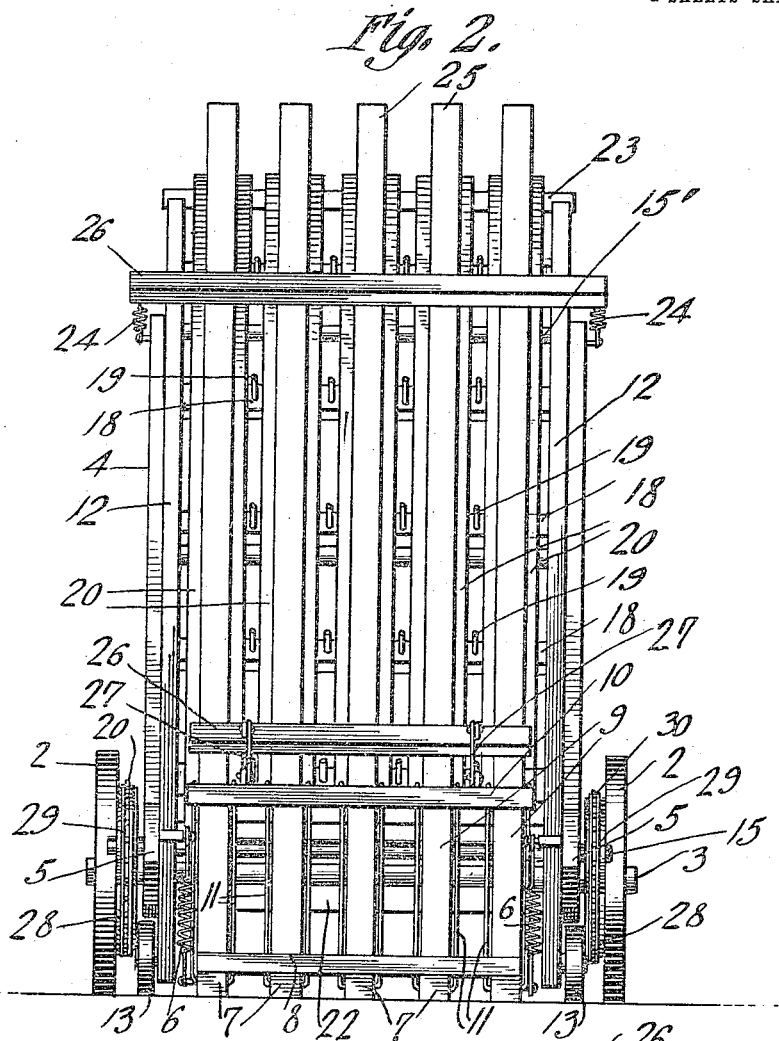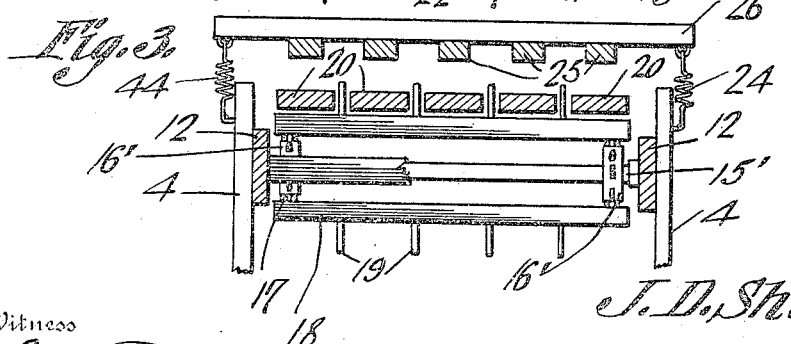

JOHN D. SHULTZ, OF ATALISSA, IOWA.

HAY-LOADER.

1,252,503.         Specification of Letters Patent.         Patented Jan. 8, 1918.

Application filed April 6, 1917. Serial No. 160,187.

*To all whom it may concern:*

Be it known that I, JOHN D. SHULTZ, a citizen of the United States, residing at Atalissa, in the county of Muscatine and State of Iowa, have invented a new and useful Hay-Loader, of which the following is a specification.

This invention relates to a hay loader in which a gathering rack coöperates with an elevator; and the objects of the invention are; to provide means for gathering the hay and delivering the same to the elevator; to provide a hay loader which may be secured to the rear of a hay rack and which will gather and load the material as it is drawn forward with the rack; and to provide a simple, cheap and efficient hay loader.

With these and such other objects in view as may hereinafter more fully appear, my invention consists in the novel arrangement and construction of parts set forth in the following description, more particularly pointed out in the claims, and a practical and preferred form of which is shown in the accompanying drawings, wherein:—

Figure 1 is a vertical longitudinal sectional view of the loader.

Fig. 2 is a rear elevation of the same.

Fig. 3 is a cross section taken on the line 3—3, Fig. 1.

Fig. 4 is a detail perspective view of the gathering rack.

Referring to the drawings by numerals, like numerals indicating similar parts throughout the several views, the wheels 2—2, with their axle 3, to which are pivotally secured the uprights 4—4 and connecting bars 5—5, constitute the main support of the device.

Resiliently secured to the connecting bars 5—5 as by means of the coiled springs 6—6, is a collecting rack comprising the spaced collecting fingers 7, which are held in place by the members 8—8, and upon which are mounted the uprights 9, across the upper ends of which is fastened a rail 10. Curved rods 11 extend from the fingers 7, to the rail 10, to which they are suitably secured.

Pivoted to the upper ends of uprights 4—4, and to the connecting bars 5—5, are the side members 12—12 of an elevator frame, the lower ends of the side members 12 being supported on wheels 13, and connected through links 14 to the gathering rack. Journaled in the elevator frame are shafts 15—15' carrying sprockets 16—16' over which pass the endless chains 17—17 carrying the cross bars 18, from each of which rise the spaced fingers 19. Secured to the elevator frame, and overlying the same, are longitudinally disposed spaced slats 20, between which the fingers 19 project, the slats 20 terminating at their lower ends in the curved guides 21, the ends of which are secured to a cross bar 22, secured to the connecting bars 5—5, and to the upper ends of which is secured a platform 23. A rod 22' may rise from a finger 7 and slide in an aperture formed in the cross bar 22. A head 23' is provided on this rod to limit the downward throw of the fingers due to the action of the coiled springs 6.

Resiliently secured to the uprights 4—4, as by means of the coiled springs 24—24, is a retaining member consisting of spaced slats 25 connected by the cross bars 26—26, and having connection through links 27—27, with the rail 10 of the gathering rack.

Any suitable system of gearing may be employed for operating the loader, that shown herein consisting of a sprocket wheel 28 secured to the hub of one of the wheels 2, and a sprocket wheel 29, mounted on the shaft 15, over which passes the chain 30.

In use the loader is attached to the rear end of a wagon or hay rack and travels with the same. As the loader progresses, the fingers 7 slide along the ground, the points thereof being kept in close contact therewith by the action of the springs 6—6, and collect the hay which is distributed on the ground. The hay collected by the fingers 7 is guided by the curved rods 11 and the guides 21 onto the elevator where it is caught by the fingers 19 and elevated, sliding between the slats 20, and the slats 25 of the retaining member.

Having described my invention, what I claim as new and desire to secure by Letters Patent, is:—

1. In a hay loader, a wheel supported frame, an endless carrier in the frame, retaining bars overlying the carrier, means for operating the carrier, a gathering rack comprising collecting fingers, cross bars connecting the fingers, uprights rising from a median point on the fingers, a rail seated upon and secured to the upper end of the uprights, links connecting the rail to the retaining bars, and links connecting certain of the gathering fingers to the frame.

2. In a hay loader, a frame, an endless carrier in the frame, retaining bars overlying the carrier, means for operating the carrier, a gathering rack comprising collecting fingers, uprights on the fingers, a rail resting upon and secured to the upper ends of the uprights, guide rods extending from the rail to each finger, links connecting the rail to the retaining bars, and links connecting certain of the fingers to the frame.

In testimony that I claim the foregoing as my own, I have hereto affixed my signature in the presence of two witnesses.

JOHN D. SHULTZ.

Witnesses:
H. H. WHITEHEAD,
F. NACHLEAM.

Copies of this patent may be obtained for five cents each, by addressing the "Commissioner of Patents, Washington, D. C."